(12) United States Patent
Kim

(10) Patent No.: US 11,729,173 B2
(45) Date of Patent: Aug. 15, 2023

(54) APPARATUS AND METHOD FOR ONLINE SERVICE ACCESS CONTROL

(71) Applicant: NCSOFT Corporation, Seoul (KR)

(72) Inventor: Taekhun Kim, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 99 days.

(21) Appl. No.: 17/114,997

(22) Filed: Dec. 8, 2020

(65) Prior Publication Data

US 2021/0185045 A1 Jun. 17, 2021

(30) Foreign Application Priority Data

Dec. 16, 2019 (KR) .................. 10-2019-0168021

(51) Int. Cl.
*H04L 67/143* (2022.01)
*H04L 67/01* (2022.01)
*H04L 67/51* (2022.01)
*H04L 9/40* (2022.01)

(52) U.S. Cl.
CPC ........ *H04L 63/101* (2013.01); *H04L 63/0876* (2013.01); *H04L 67/01* (2022.05); *H04L 67/143* (2013.01); *H04L 67/51* (2022.05)

(58) Field of Classification Search
CPC ....... H04L 63/101; H04L 67/01; H04L 67/51; H04L 67/143; H04L 63/0876
See application file for complete search history.

(56) References Cited

U.S. PATENT DOCUMENTS 11,082,431 B2 * 8/2021 Nayshtut ............... G06F 21/554
2002/0091834 A1 7/2002 Isozu et al.
2004/0114030 A1 6/2004 Ohkawa et al.
(Continued)

FOREIGN PATENT DOCUMENTS

CN 107748790 A 3/2018
JP 2002-176432 A 6/2002
(Continued)

OTHER PUBLICATIONS

Office Action dated Oct. 13, 2020 in Korean Application No. 10-2019-0168021.
(Continued)

*Primary Examiner* — Minh Chau Nguyen
(74) *Attorney, Agent, or Firm* — Sughrue Mion, PLLC

(57) ABSTRACT

An apparatus and method for online service access control are provided. The method for online service access control according to one embodiment includes determining a device having control right for an online service from among a plurality of user devices accessing a user's account for the online service, providing data generated, by a server, for the online service to the device having control right, and providing data generated, by the device having control right, for the online service to the server, wherein the providing of the data generated by the server comprises, when the device having control right is changed to another device according to the determination, providing the device currently having control right with data required to seamlessly provide the online service, which has been provided to the device previously having control right, to the device currently having control right.

20 Claims, 7 Drawing Sheets

(56) References Cited

U.S. PATENT DOCUMENTS

| | | | | |
|---|---|---|---|---|
| 2006/0075019 | A1* | 4/2006 | Donovan | G06F 16/9535 |
| | | | | 707/E17.109 |
| 2011/0013091 | A1* | 1/2011 | Kim | H04N 7/163 |
| | | | | 348/731 |
| 2013/0024571 | A1* | 1/2013 | Wu | H04L 63/10 |
| | | | | 709/225 |
| 2014/0344704 | A1* | 11/2014 | Huang | G06F 1/1632 |
| | | | | 715/740 |
| 2018/0007099 | A1* | 1/2018 | Ein-Gil | H04L 67/51 |
| 2020/0137175 | A1* | 4/2020 | Ganci, Jr. | H04L 67/303 |
| 2021/0044645 | A1* | 2/2021 | Jayaweera | H04L 65/1093 |

FOREIGN PATENT DOCUMENTS

| | | |
|---|---|---|
| JP | 2004-146913 A | 5/2004 |
| JP | 2005-122662 A | 5/2005 |
| JP | 2007-140712 A | 6/2007 |
| JP | 2009-523537 A | 6/2009 |
| KR | 10-2013-0082985 A | 7/2013 |
| KR | 10-2013-0116107 A | 10/2013 |
| KR | 10-2014-0130352 A | 11/2014 |
| KR | 10-2023431 B1 | 11/2019 |
| TW | 201203140 A | 1/2012 |
| TW | 201543249 A | 11/2015 |
| TW | 201706933 A | 2/2017 |

OTHER PUBLICATIONS

Communication dated May 21, 2021 from the Taiwanese Patent Office in Application No. 109118302.

Communication dated Jun. 7, 2021 from the Korean Intellectual Property Office in Application No. 10-2019-0168021.

Communication dated Aug. 17, 2021 from the Japanese Patent Office in Application No. 2020-104429.

TreeWiki, "Observer (r79 Edition)", Last modified Sep. 25, 2019, 10 pages total.

Communication dated Mar. 8, 2022 from the Japanese Patent Office in Application No. 2020-104429.

Communication dated Aug. 26, 2021 from the Korean Intellectual Property Office in Application No. 10-2021-0058826.

Office Action dated Oct. 18, 2022 in Japanese Application No. 2020-104429.

* cited by examiner

APPARATUS AND METHOD FOR ONLINE SERVICE ACCESS CONTROL

CROSS-REFERENCE TO RELATED APPLICATION (S)

This application claims the benefit under 35 USC § 119(a) of Korean Patent Application No. 10-2019-0168021, filed on Dec. 16, 2019, in the Korean Intellectual Property Office, the entire disclosure of which is incorporated herein by reference for all purposes.

BACKGROUND

1. Field

The following description relates to a technology for online service access control.

2. Description of Related Art

With the development of computing devices and storage devices, not only personal computers (PCs) but also various electronic products for improving convenience of a user, such as tablet devices, personal digital assistants (PDAs), smartphones, and the like, have been introduced, which leads to increasing need to provide online services across various electronic products.

Accordingly, in recent years, numerous services that provide online services have appeared in both PC and mobile environments. In such online services, if a switch from the currently accessing device to another device occurs, a communication session between the existing device and a server that provides the online service is terminated, which causes inconvenience to the user.

For example, if an online game service user logs in to his/her online service account through a PC and uses a specific convenience function within the online game service and logs into the same online service account with his/her smartphone, a communication session between the PC and the server ends, which causes a problem in that the existing specific convenience function is inactivated.

For this reason, when the user desires to receive the online service again using the previously used device, the user needs to inconveniently recreate a communication session and processes a task.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are to provide an online service access control apparatus and method.

In one general aspect, there is provided a method of online service access control including determining a device having control right for an online service from among a plurality of user devices accessing a user's account for the online service, providing data generated, by a server, for the online service to the device having control right, and providing data generated, by the device having control right, for the online service to the server, wherein the providing of the data generated by the server includes, when the device having control right is changed to another device according to the determination, providing the device currently having control right with data required to seamlessly provide the online service, which has been provided to the device previously having control right, to the device currently having control right.

The determining may include determining the device having control right based on priorities preset for the plurality of user devices.

The determining may include determining the device having control right based on an access time of each of the plurality of user devices for the user's account.

The determining may include determining the device having control right based on a type of each of the plurality of user devices.

The determining may include determining the device having control right based on a selection of the user.

The determining may include determining the device having control right based on performance information of each of the plurality of user devices.

The method may further include, when the access of all of the plurality of user devices to the user's account is terminated, switching a state of the user's account to a log-off state.

The method may further include, when an additional user device accesses the user's account, notifying the device having control right of the access of the additional device to the user's account.

The method may further include, when access of at least one of the plurality of user devices to the user's account is terminated, notifying the device having control right of the determination of the access of the at least one user device.

The method may further include providing information related to the plurality of user devices accessing the user's account to the device having control right.

In another general aspect, there is provided an apparatus for online service access control including one or more communication interfaces, a memory storing one or more commands, and one or more processors configured to execute the one or more commands, wherein the one or more processors are configured to determine a device having control right for an online service from among a plurality of user devices accessing a user's account for the online service, provide data generated, by a server, for the online service to the device having control right through the one or more communication interfaces, and provide data generated, by the user device having control right, for the online service to the server through the one or more communication interfaces, wherein when the device having control right is changed to another device according to the determination, the one or more processors are further configured to provide the device currently having control right with data required to seamlessly provide the online service, which has been provided to the device previously having control right, to the device currently having control right.

The one or more processors may be further configured to determine the device having control right based on priorities preset for the plurality of user devices.

The one or more processors may be further configured to determine the user device having control right based on an access time of each of the plurality of user devices for the user's account.

The one or more processors may be further configured to determine the device having control right based on a type of the plurality of user devices.

The one or more processors may be further configured to determine the device having control right based on a selection of the user.

The one or more processors may be further configured to determine the device having control right based on performance information of each of the plurality of user devices.

The one or more processors may be further configured to switch a state of the user's account to a log-off state when the access of all of the plurality of user devices to the user's account is terminated.

When an additional user device accesses the user's account, the one or more processors may be further configured to notify the device having control right of the access of the additional device to the user's account.

When access of at least one of the plurality of user devices to the user's account is terminated, the one or more processors may be further configured to notify, through the one or more communication interfaces, the device having control right of the determination of the access of the at least one user device.

The one or more processors may be further configured to provide information related to the plurality of user devices accessing the user's account to the device having control right.

Other features and aspects will be apparent from the following detailed description, the drawings, and the claims.

Figure 1:
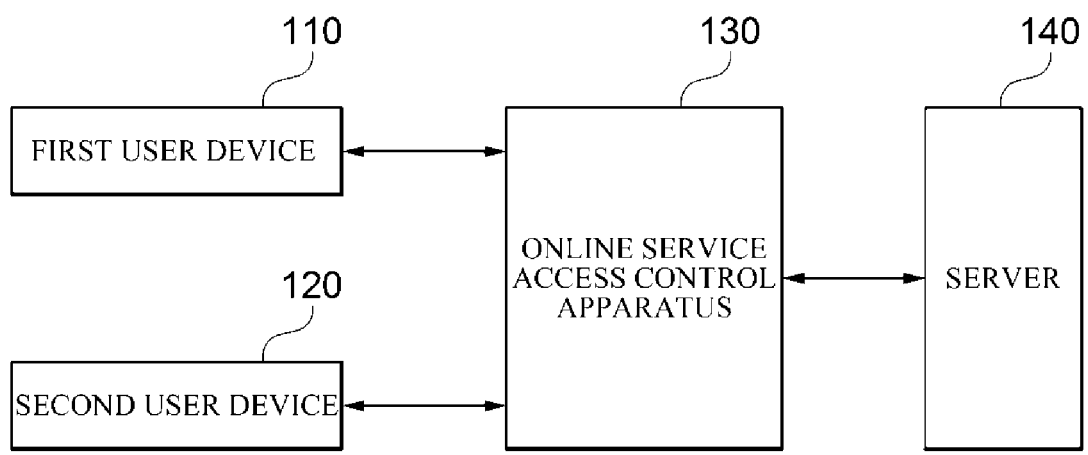
FIG. 1 is a block diagram illustrating an online service access control system according to one embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

The term "game" as used herein will be understood to mean software that one or more users can enjoy using an input device mounted in or connected to a user device. Generally, the game proceeds by the gamers manually maneuver a player character or manipulating a movement of an in-game object. The game may be classified into various genres, such as role playing game (RPG), adventure, arcade, and the like.

The term "user device" as used herein will be understood to mean a device used by a user to be provided with an online service. For example, the user device may be in the form of a personal computer (PC), a laptop computer, a game console, a smartphone, a tablet computer, or a wearable device, such as a smart band or a smart watch. However, in addition to the above examples, any device that performs a calculation and data processing according to a user's input and can transmit and receive data through a wired and/or wireless communication network will be construed to be the user device.

Hereinafter, the term "online service" will be understood to mean a service to a user device through a wired/wireless communication network. In one embodiment, the online service may be, for example, an online game service, but is not necessarily limited to a service in a specific form.

The term "input device" as used herein will be understood to mean a device for inputting data to a user device. For example, the input device may be an input device dedicated for operation and manufactured in the form of a joystick, a mouse, a keyboard, a touch screen, a hardware button, a steering wheel, an instrument, a gun, a glove, a footplate, or the like. In addition, examples of the input device may include various sensors (e.g., a temperature sensor, an infrared sensor, a motion sensor, a gyro sensor, an acceleration sensor, a gravity sensor, etc.) mounted in or interlocked with the user device, and positioning devices, such as a global positioning system (GPS), an indoor positioning system.

Meanwhile, embodiments of the present invention may include programs for performing the methods described hereinafter on a computer and computer-readable recording media including the programs. The computer-readable recording media may include, alone or in combination with, program commands, local data files, local data structures and the like. The media may be specially designed and configured for the present invention, or known and available to those of ordinary skill in the field of computer software. Examples of the computer-readable recording media include magnetic media, such as hard disks, floppy disks, and magnetic tapes, optical recording media, such as CD-ROM disks and DVDs, magneto-optical media, such as floptical disks, and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

FIG. 1 is a block diagram illustrating an online service access control system according to an embodiment.

Referring to FIG. 1, the online service access control system 100 according to an embodiment may include a first user device 110, a second user device 120, an apparatus 130 for online service access control (hereinafter, referred to as an access control apparatus), and a server 140.

The first user device 110 and the second user device 120 are used to access a user's account for an online service (hereinafter, simply referred to as a "user account") and receive an online service from the server 140.

Meanwhile, in the example illustrated in FIG. 1, it is assumed that two user devices including the first user device 110 and the second user device 120 are used by a user for convenience of description. However, the number of user devices may be one or more and is not necessarily limited to a specific number.

Meanwhile, when the user device accesses the user account, it may mean that the user device logs into the user account through a login procedure using authentication information on the user account. For example, the first user device 110 and the second user device 120 may each be installed with an online service application for receiving the online service in cooperation with the server 140. In this case, it is possible to access the user account by performing a login procedure through the online service application installed in the first user device 110 or the second user device 120.

When at least one of the first user device 110 and the second user device 120 accesses the user account, the access control apparatus 130 generates a communication session with each user device accessing the user account and relays data transmitted and received between the user device accessing the user account and the server 140 through the generated communication session.

In this case, the communication session refers to a logical connection for data transmission and reception on a network, and the term "generating a communication session" may be used as the same meaning as "connecting to a communication session".

Meanwhile, the access control apparatus 130 may generate a communication session for transmitting and receiving data with each of at least one of the first user device 110 and the second user device 120 that is accessing the user account. For example, when the second user device 120 accesses the user account in a state in which a communication session with the first user device 110 has been generated as the first user device 110 has accessed the user account, the access control apparatus 130 may generate a communication session with the second user device 120 while maintaining the communication session with the first user device 110.

The server 140 is a server for providing an online service to a user device that accesses the user account.

Specifically, the server 140 may provide the online service by transmitting and receiving data for the online service to and from a user device having control right, which is included in the first user device 110 and the second user device 120 that accesses the user account.

For example, in the case where the online service is an online game service, the server 140 may be a game server that provides an online game service in cooperation with a game application installed in each of the first user device 110 and the second user device 120.

Meanwhile, in the embodiment illustrated in FIG. 1, the access control apparatus 130 is illustrated as a configuration separate from the server 140, but according to an embodiment, the access control apparatus 130 may be implemented as one configuration included in the server 140.

Figure 2:
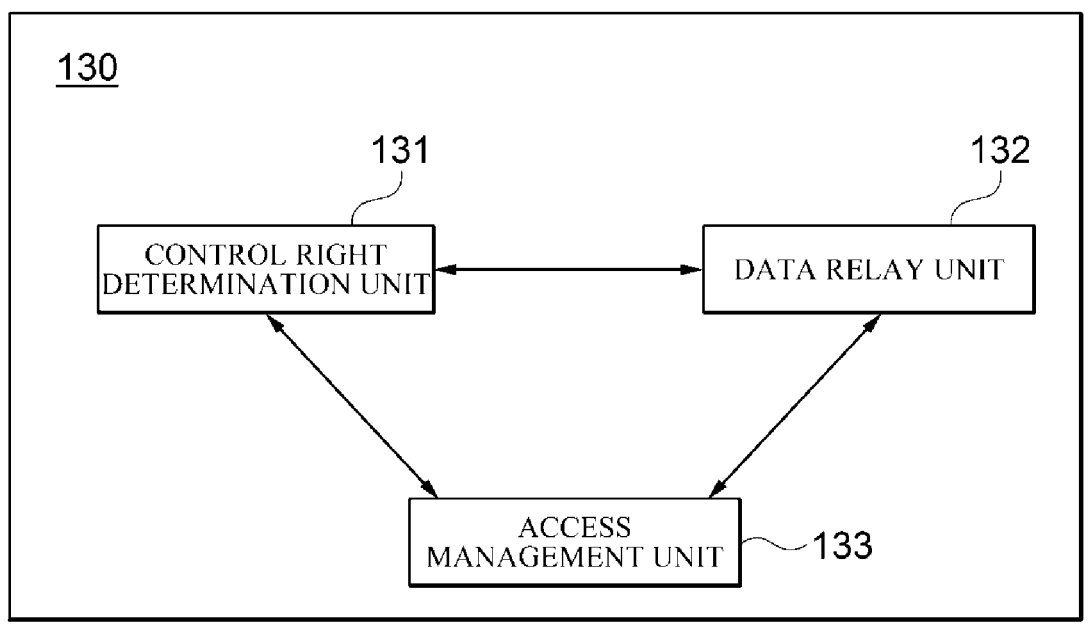
FIG. 2 is a block diagram of an apparatus for online service access control according to one embodiment.

FIG. 2 is a block diagram illustrating an access control apparatus 130 according to one embodiment.

Referring to FIG. 2, the access control apparatus 130 according to one embodiment includes control right determination unit 131, a data relay unit 132, and access management unit 133.

The control right determination unit 131 determines a device having control right for an online service from among a plurality of user devices accessing a user account.

For example, in the example shown in FIG. 1, when the first user device 110 and the second user device 120 access a user account, the control right determination unit 131 may determine which of the first user device 110 and the second user device 120 is to have control right for the online service.

According to one embodiment, the control determining unit 131 may determine a user device having control right from among the plurality of user devices accessing the user account on the basis of priorities preset for the plurality of user devices accessing the user account.

For example, the user may pre-register identification information and priority information of each of the plurality of user devices to be used to receive the online service as setting information for the user account. In this case, the identification information of each of the plurality of user devices may be, for example, a media access control (MAC) address, but is not necessarily limited to specific information as long as it can be obtained from each user device through a wired/wireless network and can uniquely identify each user device.

As a specific example, in the case where the first user device 110 and the second user device 120 that access the user account are devices registered in advance by the user and priorities are set between the first user device 110 and the second user device 120, the control right determination unit 131 may determine that one of the first user device 110 and the second user device 120 which has a higher priority than the other is a device having control right for the online service.

Meanwhile, according to one embodiment, the control right determination unit 131 may determine a device having control right for the online service from among the plurality of user devices on the basis of an access time of each of the plurality of user devices accessing the user account.

For example, when the second user device 120 accesses the user account while the first user device 110 is accessing the user account, the control right determination unit 131 may determine that the second user device 120 has control right for the online service.

According to one embodiment, the control right determination unit 131 may determine a device having control right for the online service from among the plurality of user devices on the basis of the type of each of the plurality of user devices accessing the user account.

In this case, the type of the user device may be, for example, a smartphone, a tablet PC, a desktop PC, or the like, but is not necessarily limited to the above-described examples and may be variously set according to an embodiment.

In detail, when a plurality of user devices access the user account, the control right determination unit 131 may determine a device having control right according to a preset priority based on the type of each user device.

For example, the user may pre-register priority information for each type of user device and identification information and type identification information of each of a plurality of user devices used to receive an online service as setting information for the user account. In this case, when a plurality of user devices access the user account, the control right determination unit 131 may identify each user device based on the identification information of each user device and the setting information registered in the user account. Thereafter, the control right determination unit 131 may determine a device that has control right for the online service on the basis of the priority information for each type of user device and the type of the each user device identified.

As a specific example, when the priority for each type is given by the user in the order of a smartphone, a tablet PC, and a desktop PC and when the first user device 110 is a smartphone and the second user device 120 is a desktop PC, the control right determination unit 131 may determine that the first user device 110 has control right for the online service.

Meanwhile, according to one embodiment, the control right determination unit 131 may determine a device having control right for the online service from among the plurality of user devices accessing the user account on the basis of the user's selection.

For example, in a case where the user requests switch of the control right for the online service to the second user device 120 using the first user device 110 or the second user device 120 in a state where the first user device 110 and the second user device 120 are accessing the user account and the first user device 110 has control right for the online service, the control right determination unit 131 may switch the control right from the first user device 110 to the second user device 120 in response to the user's request.

According to one embodiment, the control right determination unit 131 may determine a device having control right for the online service from among the plurality of user devices on the basis of performance information of each of the plurality of user devices accessing the user account.

In this case, the performance information may include a variety of information, for example, CPU performance, CPU usage, memory size, storage space size, storage space usage, memory usage, battery capacity, battery remaining capacity, and the like, which can be used to evaluate the performance of each user device accessing the user account.

For example, when the first user device 110 and the second user device 120 are accessing the user account, the control right determination unit 131 may collect the performance information from the first user device 110 and the second user device 120 and determine which of the first user device 110 and the second user device 120 is to have control right for the online service on the basis of the collected performance information.

In a more specific example, when the CPU performance of the first user device 110 is higher than the CPU performance of the second user device 120 and the CPU usage of the first user device 110 is lower than the CPU usage of the second user device 120, the control right determination unit 131 may determine that the first user device 110 has control right for the online service.

In another example, the control right determination unit 131 may compare the memory size and the memory usage of the first user device 110 with the memory size and the memory usage of the second user device 120 and determine that the user device having more memory free space than the other has control right for the online service.

In another example, the control right determination unit 131 may determine that one of the first user device 110 and the second user device 120, which has a higher battery remaining capacity than the other, has control right for the online service.

Meanwhile, according to an embodiment, when there is a user device having a remaining battery percentage lower than or equal to a preset percentage (%) among the plurality of user devices accessing the user account, the control right determination unit 131 may restrict the corresponding user device from having the control right, regardless of the selection of the user of the online service account.

According to one embodiment, the control right determination unit 131 may determine a device having control right from among the plurality of user devices accessing the user account in accordance with one or more of a plurality of embodiments described above.

According to an embodiment, the control right determination unit 131 may provide information on whether each user device has control right for the online service to each of the plurality of user devices accessing the user account.

For example, when the first user device 110 and the second user device 120 are accessing the user account and the first user device 110 is determined to be a device having the control, the control right determination unit 131 may notify the first user device 110 and the second user device 120 that the first user device 110 currently has the control right.

In this case, the first user device 110 may display a graphic object, a phrase, or a sign to indicate that the first user device 110 has the control right for the online service on the display screen of the first user device 110.

In addition, the second user device 120 may display a graphic object, a phrase, or a sign to indicate that the second user device 120 has no control right for the online service on the display screen of the second user device 120.

The data relay unit 132 provides data generated by the server 140 for the online service to the device having control right for the online service among the plurality of user devices accessing the user account. In addition, the data relay unit 132 provides the server 140 with data generated by the user device having the control right for the online service among the plurality of user devices.

According to one embodiment, the data relay unit 132 may receive data generated by the server 140 for the online service from the server 140 and transmits the received data to the user device having control right for the online service among the plurality of user devices accessing the user account. In this case, the data relay unit 132 may transmit the data received from the server 140 to the device having control right through a communication session generated with each of the user device having control right.

In addition, according to one embodiment, the data relay unit 132 may receive data generated by the device having control right for the online service from the device having control right and transmit the received data to the server 140. In this case, the data relay unit 132 may receive the data from the device having control right through a communication session generated with, for example, the device having control right and transmit the received data to the server 140.

For example, when the first user device 110 and the second user device 120 are accessing the user account and the first user device 110 has control right, the data relay unit 132 may generate a communication session with each of the first user device 110 and the second user device 120 for transmitting and receiving data. Also, the data relay unit 132 may provide the data generated by the server 140 for the online service to the first user device 110 through a first communication session generated with the first user device 110.

In addition, the data relay unit 132 may receive the data generated by the first user device 110 for the online service from the first user device 110 through the first communication session and provide the same to the server 140.

Meanwhile, according to one embodiment, when the control right determination unit 131 has changed the device having control right for the online service to another user device, the data relay unit 132 provides the device currently having control right with data required to seamlessly provide the online service, which has been provided to the user device previously having control right, to the current user device having control right.

For example, when the online service is a game service and the device having control right for the online service is changed from the first user device 110 to the second user device 120, the data relay unit 132 may provide the second user device 120 with data for allowing the online game executed on the first user device 110 to be seamlessly executed on the second user device 120 at the time of changing the device having control right.

However, the data required to seamlessly provide the online service to the device currently having control right may include various types of data according to the type of the online service and the form in which the online service is provided, and the data is not necessarily limited to specific data.

On the other hand, according to one embodiment, the data generated by the server 140 for the online service may be result data for an operation and data processing to be performed on the side of the server among operations and data processing required for the online service. Also, the data generated by the user device having control right for the online service may be result data for an operation and data processing to be performed on the side of the user device having control right among operations and data processing required for the online service. In this case, an operation and data processing to be performed for the online service by each of the server 140 and the user device having control right may vary depending on the online service.

The access management unit 133 monitors an access status of each user device which accesses the user account.

According to one embodiment, the access management unit 133 may provide information related to the user devices currently accessing the user account to a device having control right among the devices accessing the user account. In this case, the information related to the user devices accessing the user account may include information, such as the number of user devices accessing the user account, the type of each user device accessing the user account, identification information, access time point, and the like.

Meanwhile, according to one embodiment, when the access of at least one of the plurality of user devices to the user account is terminated, the access management unit 133 may notify the device having control right among the plurality of user devices of the termination of the access of the at least one user device. For example, the access management unit 133 may provide the device having control right with a variety of information, such as the type, the identification information, and the access termination time of the user device that has terminated its access to the user account, to notify the user that the access of the user device to the user account has been terminated.

In addition, according to one embodiment, the access management unit 133 may switch a state of the user account to a log-off state when all accesses of each of the plurality of user devices to the user account are terminated. For example, when all of the communication sessions generated with each of the user devices accessing the user account are terminated, the access management unit 133 may determine that the access of all the user devices to the user account is terminated, and may switch the state of the user account to a log-off state.

Also, according to one embodiment, when an additional user device accesses the user account while a plurality of user devices are accessing the user account, the access management unit 133 may notify the device having control right among the plurality of user devices that the additional user device accesses the user account. For example, the access management unit 133 may provide the device having control right with a variety of information, such as the type, the identification information, and the access time of the additional user device that accesses the user account, to notify the user that the new user device accesses to the user account.

Figure 3:
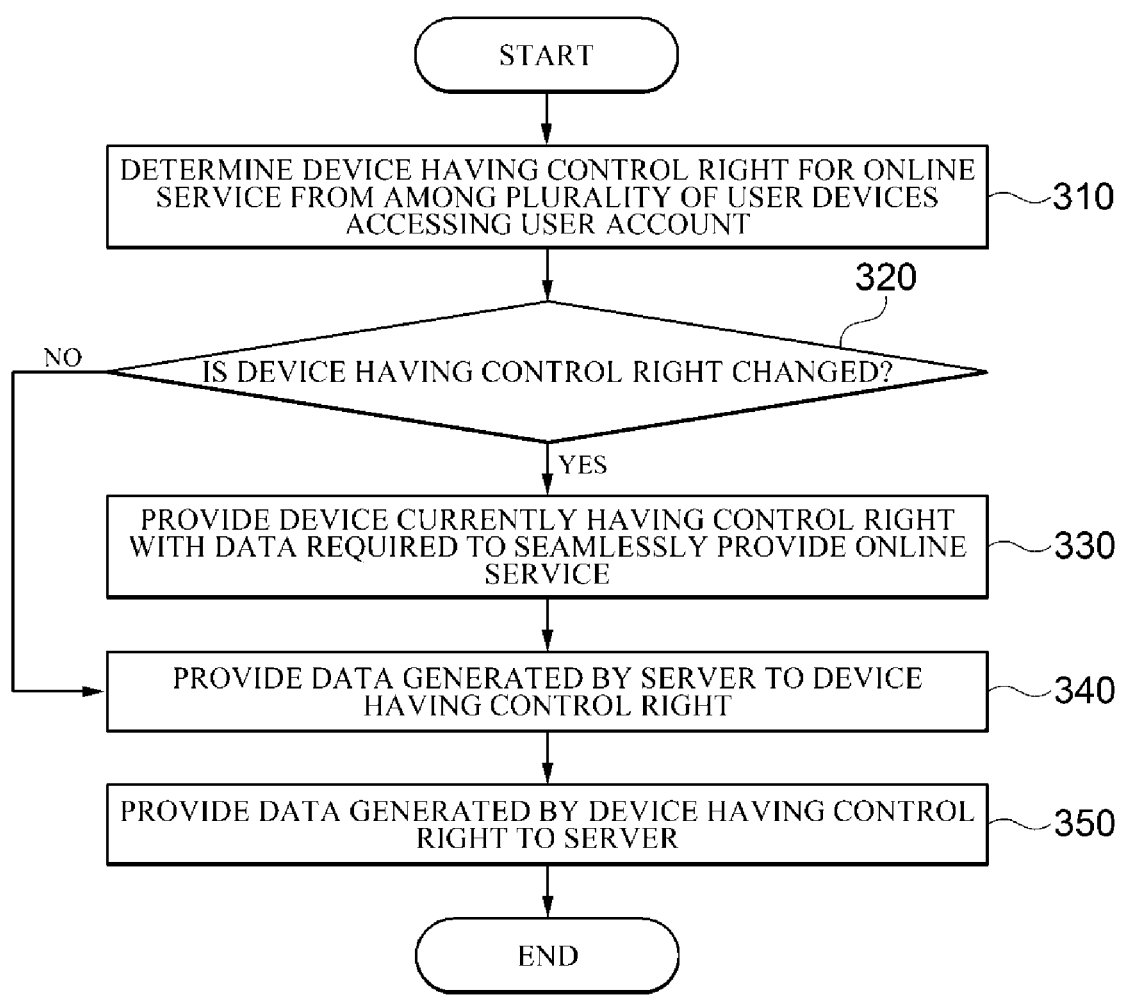
FIG. 3 is a flowchart illustrating a method for online service access control according to one embodiment.

FIG. 3 is a flowchart illustrating a method of online service access control according to one embodiment.

The method shown in FIG. 3 may be performed by, for example, the access control apparatus 130 described above.

Referring to FIG. 3, first, the access control apparatus 130 determines a user device having control right for an online service from among a plurality of user devices accessing a user account (310).

In this case, when the user device having control right for the online service is changed (320), the access control apparatus 130 provides the device currently having control right with data required to seamlessly provide the online service to the device currently having control right (330).

Thereafter, the access control apparatus 130 provides the data generated by the server 140 for the online service to the device having control right (340).

Then, the access control apparatus 130 provides data generated by the user device having control right for the online service to the server 140 (350).

Meanwhile, in the flowchart illustrated in FIG. 3, at least some of the operations may be performed in different order or may be combined into fewer operations or further divided into more operations. In addition, some of the operations may be omitted, or one or more extra operations, which are not illustrated, may be added to the flowchart and be performed.

Figure 4:
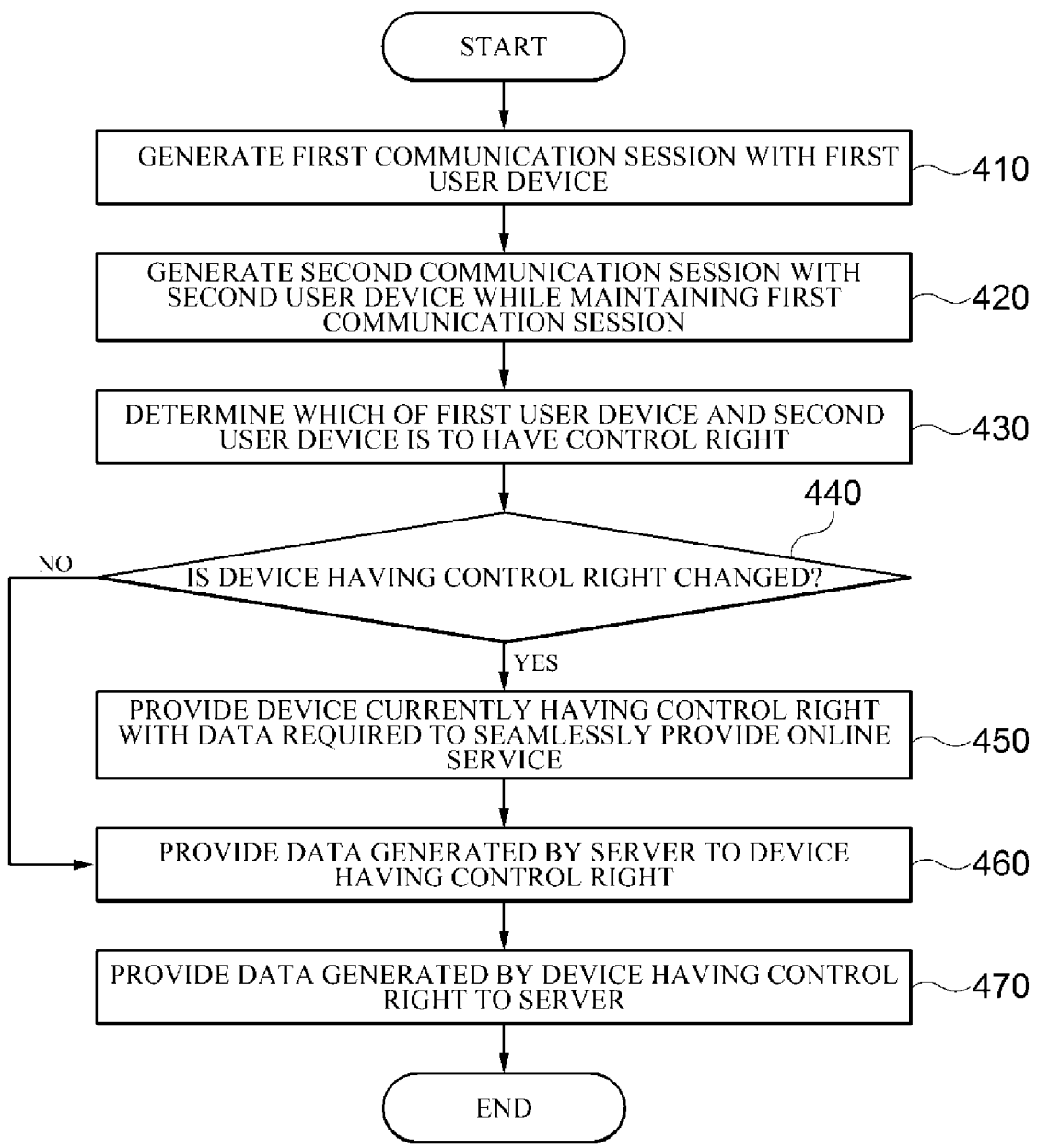
FIG. 4 is a detailed flowchart illustrating a method for online service access control according to one embodiment.

FIG. 4 is a detailed flowchart illustrating a method of online service access control according to one embodiment.

The method shown in FIG. 4 may be performed by, for example, the access control apparatus 130 described above.

Referring to FIG. 4, first, when the first user device 110 accesses a user account, the access control apparatus 130 generates a first communication session with the first user device 110 (410).

Then, when the second user device 120 accesses the same user account, the access control apparatus 130 generates a second communication session with the second user device 120 while maintaining the first communication session (420).

Thereafter, the online control apparatus 140 determines which of the first user device 110 and the second user device 120 is to have control right for an online service (430).

In this case, when the device having control right for the online service is changed (440), the access control apparatus 130 provides the device currently having control right with data required to seamlessly provide the online service to the device currently having control right (450).

Subsequently, the access control apparatus 130 provides the data generated by the server 140 for the online service to the device currently having control right (460).

Then, the access control apparatus 130 provides the server 140 with data generated, by the device having control right (470).

Meanwhile, in the flowchart illustrated in FIG. 4, at least some of the operations may be performed in different order or may be combined into fewer operations or further divided into more operations. In addition, some of the operations may be omitted, or one or more extra operations, which are not illustrated, may be added to the flowchart and be performed.

Figure 5:
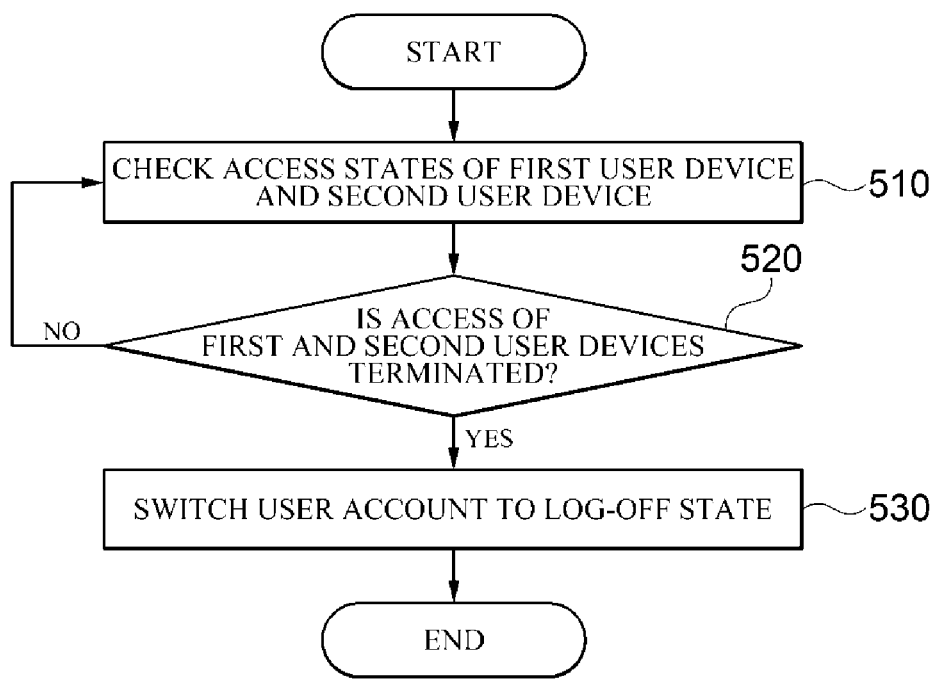
FIG. 5 is a flowchart illustrating an access state management procedure according to one embodiment.

FIG. 5 is a flowchart illustrating an access state management procedure according to one embodiment.

The method shown in FIG. 5 may be performed by, for example, the access control apparatus 130 described above.

Referring to FIG. 5, the access control apparatus 130 checks an access state of each of the first user device 110 and the second user device 120 that are accessing a user account (510).

Subsequently, when the access of all of the first user device 110 and the second user device 120 to the user account is terminated, the access control apparatus 130 switches the state of the corresponding user account to a log-off state (520 and 530).

Meanwhile, in the flowchart illustrated in FIG. 5, at least some of the operations may be performed in different order or may be combined into fewer operations or further divided into more operations. In addition, some of the operations may be omitted, or one or more extra operations, which are not illustrated, may be added to the flowchart and be performed.

Figure 6:
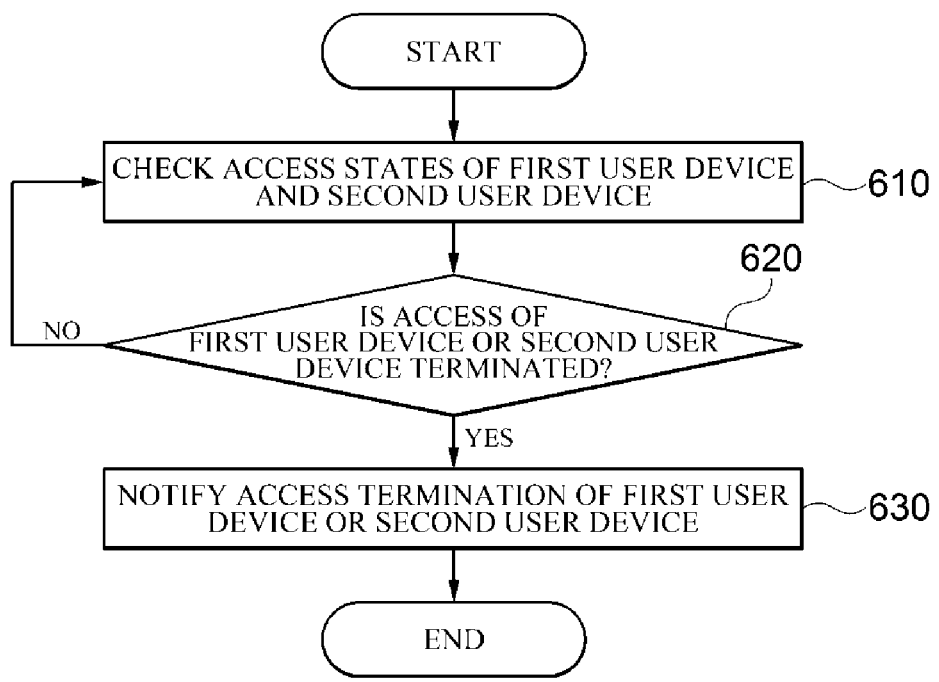
FIG. 6 is a flowchart illustrating an access state management procedure according to another embodiment.

FIG. 6 is a flowchart illustrating an access state management procedure according to another embodiment.

The method illustrated in FIG. 6 may be performed by, for example, the connection control device 130 described above.

Referring to FIG. 6, the access control apparatus 130 checks an access state of each of the first user device 110 and the second user device 120 that are accessing a user account (610).

Thereafter, when the access of one of the first user device 110 and the second user device 120 to the user account is terminated, the access control apparatus 130 notifies the other of the first user device 110 and the second user device 120 that maintains its access to the user account that the access of the user device is terminated (620 and 630).

Figure 7:
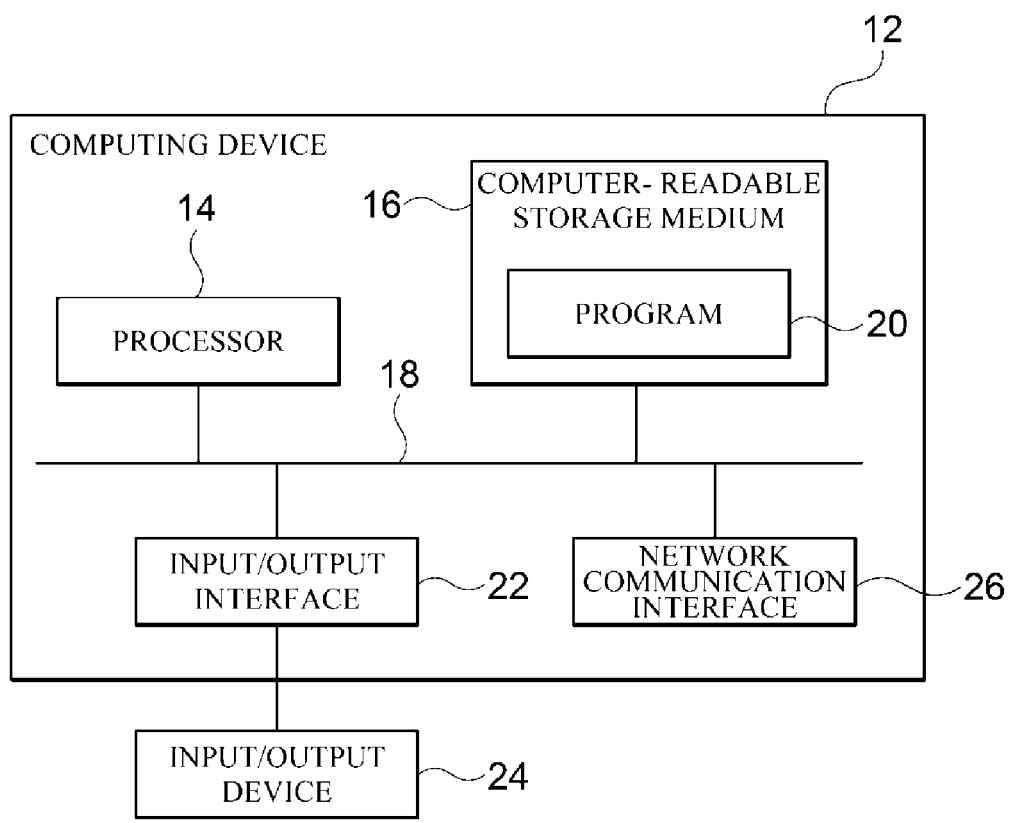
FIG. 7 is a block diagram for describing a computing environment including a computing device suitable for use in exemplary embodiments.

FIG. 7 is a block diagram for describing a computing environment including a computing device 10 suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an access control apparatus 130.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the disclosed embodiments, when a plurality of user devices access a user's account for an online service, data for the online service is transmitted and received to and from the device having control right among the plurality of user devices, wherein when the device having control right is changed to another device, data that allows the online service to be seamlessly provided to the device currently having control right is provided, so that it is possible to provide the seamless online service even when the device having control right is changed.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

What is claimed is:

1. A method for online service access control, comprising:
   determining a device having control right for an online service from among a plurality of user devices, the plurality of user devices including a first device and a second device that concurrently access a same user's account of a user for the online service by logging into the same user's account through a login process using authentication information on the user's account;
   providing data generated, by a server providing the online service, for the online service to the device having control right; and
   providing data generated, by the device having control right, for the online service to the server,
   wherein the providing of the data generated by the server comprises, based on the device having control right being changed from the first device to the second device according to the determination, providing the second device currently having control right with data required to seamlessly provide the online service, which has been previously provided to the first device previously having control right.

2. The method of claim 1, wherein the determining comprises determining the device having control right based on priorities preset for the plurality of user devices.

3. The method of claim 1, wherein the determining comprises determining the device having control right based on an access time of each of the plurality of user devices for the user's account.

4. The method of claim 1, wherein the determining comprises determining the device having control right based on a type of each of the plurality of user devices.

5. The method of claim 1, wherein the determining comprises determining the device having control right based on a selection of the same user.

6. The method of claim 1, wherein the determining comprises determining the device having control right based on performance information of each of the plurality of user devices.

7. The method of claim 1, further comprising, when the access of all of the plurality of user devices to the user's account is terminated, switching a state of the user's account to a log-off state.

8. The method of claim 1, further comprising, when an additional user device accesses the user's account, notifying the device having control right of the access of the additional user device to the user's account.

9. The method of claim 1, further comprising, when access of at least one user device of the plurality of user devices to the user's account is terminated, notifying the device having control right of the determination of the access of the at least one user device.

10. The method of claim 1, further comprising providing information related to the plurality of user devices accessing the user's account to the device having control right.

11. An apparatus for online service access control, comprising:
one or more communication interfaces;
a memory storing one or more commands; and
one or more processors configured to execute the one or more commands,
wherein the one or more processors are configured to:
determine a device having control right for an online service from among a plurality of user devices, the plurality of user devices including a first device and a second device that concurrently access a same user's account of a user for the online service by logging into the same user's account through a login process using authentication information on the user's account,
provide data generated, by a server providing the online service, for the online service to the device having control right through the one or more communication interfaces, and
provide data generated, by the device having control right, for the online service to the server through the one or more communication interfaces,
wherein, based on the device having control right being changed from the first device to the second device according to the determination, the one or more processors are further configured to provide the second device currently having control right with data required to seamlessly provide the online service, which has been previously provided to the first device previously having control right.

12. The apparatus of claim 11, wherein the one or more processors are further configured to determine the device having control right based on priorities preset for the plurality of user devices.

13. The apparatus of claim 11, wherein the one or more processors are further configured to determine the device having control right based on an access time of each of the plurality of user devices for the user's account.

14. The apparatus of claim 11, wherein the one or more processors are further configured to determine the device having control right based on a type of the plurality of user devices.

15. The apparatus of claim 11, wherein the one or more processors are further configured to determine the device having control right based on a selection of the same user.

16. The apparatus of claim 11, wherein the one or more processors are further configured to determine the device having control right based on performance information of each of the plurality of user devices.

17. The apparatus of claim 11, wherein the one or more processors are further configured to, when the access of all of the plurality of user devices to a state of the user's account is terminated, switch the user's account to a log-off state.

18. The apparatus of claim 11, wherein the one or more processors are further configured to, when an additional user device accesses the user's account, notify the device having control right of the access of the additional user device to the user's account.

19. The apparatus of claim 11, wherein the one or more processors are further configured to, when access of at least one user device of the plurality of user devices to the user's account is terminated, notify, through the one or more communication interfaces, the device having control right of the determination of the access of the at least one user device.

20. The apparatus of claim 11, wherein the one or more processors are further configured to provide information related to the plurality of user devices accessing the user's account to the device having control right.

* * * * *